Sept. 17, 1935. J. R. COFFEY ET AL 2,014,834
SCREEN
Filed June 20, 1934

INVENTOR
J. R. Coffey &
H. Adams
BY
ATTORNEY

Patented Sept. 17, 1935

2,014,834

UNITED STATES PATENT OFFICE 2,014,834

SCREEN

James Russell Coffey and Harry Adams, Louisville, Ky., assignors to Louisville Drying Machinery Co., Louisville, Ky.

Application June 20, 1934, Serial No. 731,455

4 Claims. (Cl. 210—151)

Our invention relates to a device for screening wet material, such as distillery slop, and has reference more particularly to a screen in which the material to be filtered is moved and distributed on the screen against the tendency of the material to be filtered to move gravitationally on the screen.

Another object of the invention is to provide a screen with means to insure efficient distribution of the material to be filtered all over the screen.

Figure 1:
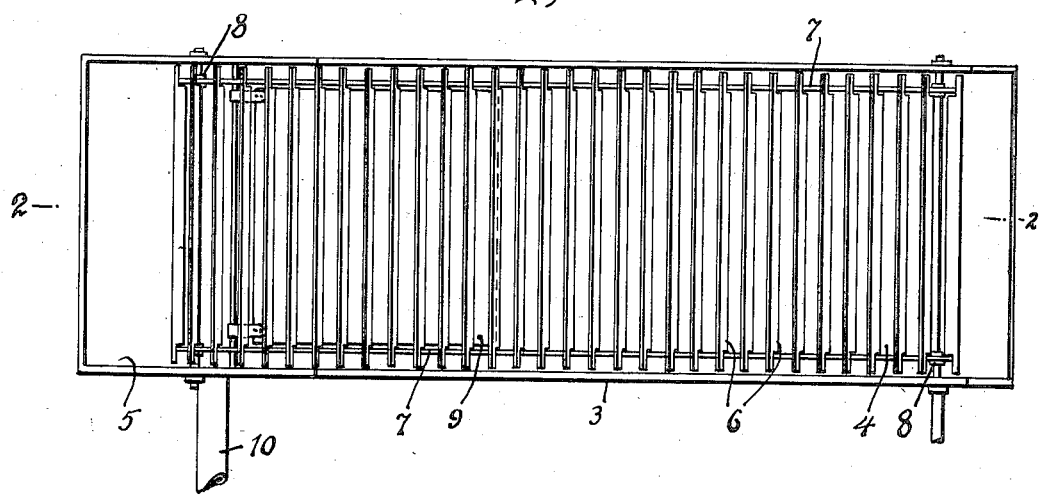
Figure 2:
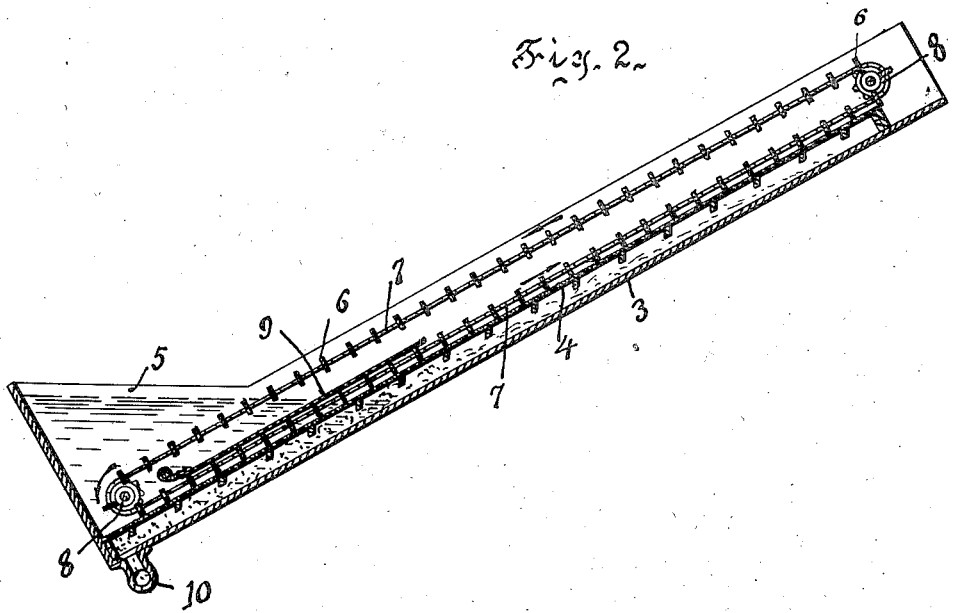

In the appended drawing forming part of this application, Figure 1 is a plane of a device embodying our invention, and Figure 2 is a vertical section on line 2—2, Figure 1.

Referring to the drawing, 3 is a box disposed at an angle to the horizontal, to get the desired amount of inclination for the perforated screen 4 provided within the box 3. The box has at the lower end an extension 5 with horizontal sides to form a sluice whereinto the material to be filtered is charged by any suitable means, not shown.

To distribute the material to be filtered from the sluice of the box over the screen 4, we employ a series of paddles 6 mounted on chains 7 engaged by sprockets 8, the shafts for which are located in the sides of the box. Means for moving the sprockets, chains and paddles are not shown. The paddles are normally maintained in contact with the screen by gravity, and from the direction of rotation of the sprockets shown in the drawing, it will be seen that the paddles move up the inclined screen or against the tendency of the material to be screened to move downward on the inclined screen.

The spaces between adjacent paddles and the screen in contact with the paddles, form a compartment or scoop which takes the material located in 5 of the box 3 and moves it along the screen, during its travel naturally losing the liquid consistency thereof soon after leaving the level of liquid in the box, but still continuing to carry and distribute the semi-dried portion thereof over the screen, so that filtration takes place not directly through the screen but through a layer of material on the screen.

To prevent the spilling of the liquid portion of the material included between adjacent paddles that are in engagement with the screen, due to the slope of the screen as it emerges, we provide a baffle 9, a portion of which is within the liquid part and a portion above the liquid, the paddles passing under said baffle as they travel from the liquid to the dry part of the screen. The baffle also prevents spilling of liquid that may be caused by eddies or vibration due to the motion of the paddles by the chains on the screen. The baffle 9, as shown, is hinged at its lower end so that its contact with the passing paddles is maintained by gravity, tending to swing the baffle on its pivot.

Under the action of gravity, material distributed on the screen by the baffle has a tendency to slip or move along the screen and through it, under the action of gravity, while the baffles try to move the material against that tendency, the baffles maintaining a substantial uniform thickness of the material on the screen. The material filtered through the screen finds its outlet through a passage 10 provided in the box below the screen at its lowest part.

The baffle 9 prevents removal of thickened material or semi-solids from between the paddles while said paddles are travelling beneath the surface of the liquid. It has been found in actual practice that if this baffle is not present, the passage of the paddles through the liquid causes a disturbance which actually empties out the settled material from therebetween and prevents a proper functioning of the screen.

We claim:

1. In a screen, an inclined box having at its lower part means for receiving material to be screened, a similarly inclined screen located in the box having a portion thereof immersed in the material to be screened, a series of travelling paddles adapted to move in the box over the screen, to distribute the material to be filtered against the gravitational tendency of the material to move on the screen, and a baffle located within the box inclined similarly to the screen and engaging the paddles as they move over the screen while passing from the immersed part of the screen.

2. In a screen, an inclined box having at its lower part means for receiving material to be screened, a similarly inclined screen in the box having a portion thereof immersed in the material to be screened, a series of travelling paddles adapted to move in the box over the screen to distribute the material to be filtered against the gravitational tendency of the material to move on the screen, and a baffle in the box inclined similarly to the screen engaging gravitationally the paddles as they move over the screen in passing from the immersed part of the screen.

3. In a screen, an inclined box having at its lower part means for receiving material to be screened, a screen located in the box having a portion thereof immersed in the material to be screened, a series of travelling paddles adapted to move in the box over the screen to distribute the material to be filtered against the gravitational tendency of the material to move on the screen, and a baffle pivotally mounted within the box and engaging the paddles as they move over the screen while passing from the immersed part of the screen.

4. In a screen, an inclined box having at its lower part means for receiving material to be screened, a similarly inclined screen located in the box having a portion thereof immersed in the material to be screened, a series of travelling paddles adapted to move in the box over the screen to distribute the material to be filtered against the gravitational tendency of the material to move on the screen, and a baffle located within the box inclined similarly to the screen and having a portion thereof immersed in the material to be screened and engaging the paddles gravitationaly as they move over the screen while passing from the immersed part of the screen.

JAMES RUSSELL COFFEY.
HARRY ADAMS.